United States Patent
Slegel et al.

(10) Patent No.: US 7,197,601 B2
(45) Date of Patent: *Mar. 27, 2007

(54) METHOD, SYSTEM AND PROGRAM PRODUCT FOR INVALIDATING A RANGE OF SELECTED STORAGE TRANSLATION TABLE ENTRIES

(75) Inventors: Timothy J. Slegel, Staatsburg, NY (US); Lisa C. Heller, Rhinebeck, NY (US); Erwin F. Pfeffer, Wuerttemberg (DE); Kenneth E. Plambeck, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/199,666

(22) Filed: Aug. 9, 2005

(65) Prior Publication Data

US 2005/0268045 A1    Dec. 1, 2005

Related U.S. Application Data

(62) Division of application No. 10/435,919, filed on May 12, 2003.

(51) Int. Cl.
*G06F 12/00* (2006.01)
(52) U.S. Cl. .................. 711/133; 711/156; 711/205; 711/206
(58) Field of Classification Search .................. None
See application file for complete search history.

(56) References Cited

U.S. PATENT DOCUMENTS 4,432,053 A    2/1984    Gaither et al. .............. 364/200
5,307,502 A    4/1994    Watanabe et al. ........... 395/800
5,317,705 A    5/1994    Gannon et al. .............. 395/400
5,423,014 A    6/1995    Hinton et al. ................... 711/3
5,471,593 A    11/1995   Branigin ..................... 395/376
5,500,948 A    3/1996    Hinton et al. ............... 711/205
5,555,394 A    9/1996    Arakawa et al. ............ 395/462
5,761,734 A    6/1998    Pfeffer et al. ............... 711/164
5,771,365 A    6/1998    McMahan et al. .......... 395/381

(Continued)

FOREIGN PATENT DOCUMENTS

| EP | 0 206 653 B1 | 6/1986 |
|---|---|---|
| EP | 0220451 | 5/1987 |
| EP | 1 182 570 A2 | 5/2001 |
| JP | 5815195 A | 9/1983 |
| JP | 5815196 A | 9/1983 |
| WO | WO 02/086730 A | 11/2002 |

OTHER PUBLICATIONS

"z/Architecture Principles of Operation," IBM Publication No. SA22-7832-00, Dec. 2000, Chapter 3, pp. 1-49; Chapter 10, pp. 18-19 and 29-30.

(Continued)

*Primary Examiner*—Reginald Bragdon
*Assistant Examiner*—Mehdi Namazi
(74) *Attorney, Agent, or Firm*—John E. Campbell

(57) ABSTRACT

Selected units of storage, such as segments of storage or regions of storage, may be invalidated. The invalidation is facilitated by the setting of invalidation indicators located in data structure entries corresponding to the units of storage to be invalidated. Additionally, buffer entries associated with the invalidated units of storage or other chosen units of storage may be cleared. An instruction is provided to perform the invalidation and clearing. The instruction can be implemented by software emulation, hardware, firmware or some combination thereof.

57 Claims, 10 Drawing Sheets

U.S. PATENT DOCUMENTS

| | | | |
|---|---|---|---|
| 5,928,353 A | 7/1999 | Yamada | 712/200 |
| 5,946,717 A | 8/1999 | Uchibori | 711/207 |
| 6,079,013 A | 6/2000 | Webb et al. | 712/227 |
| 6,119,204 A | 9/2000 | Chang et al. | 711/141 |
| 6,119,219 A | 9/2000 | Webb et al. | 712/227 |
| 6,260,130 B1 | 7/2001 | Liedtke | 711/206 |
| 6,308,255 B1 | 10/2001 | Gorishek, IV et al. | 712/209 |
| 6,467,007 B1 * | 10/2002 | Armstrong et al. | 710/260 |
| 6,604,187 B1 * | 8/2003 | McGrath et al. | 711/209 |
| 6,978,357 B1 | 12/2005 | Hacking et al. | 711/214 |
| 2002/0029357 A1 | 3/2002 | Charnell | |
| 2004/0230749 A1 | 11/2004 | Slegel et al. | 711/144 |
| 2004/0230796 A1 | 11/2004 | Slegel et al. | 718/100 |

OTHER PUBLICATIONS

"Query Evaluation Techniques for Large Databases", G. Graefe, ACM Computing Surveys, vol. 25, No. 2, Jun. 1993, pp. 73-170.

"Tree Bitmap: Hardware/Software IP Lookups with Incremental Updates", E. Eatherton et al., ACM SIGCOMM Computer Communications Review, vol. 34, No. 2, Apr. 2004, pp. 97-122.

"Key Sequence Data Sets on Indelible Storage", IBM Journal of Research and Development, vol. 30, No. 3, pp. 230-241; May 1986 (Abstract Only).

"Storage-Key-Exception Control", IBM Technical Disclosure Bulletin, vol. 24, No. 3, pp. 1400, Aug. 1981.

"Enterprise Systems Architecture/390 Principles of Operation", Jul. 31, 2001, pp. 10-1; 10-26; 10-27.

* cited by examiner

METHOD, SYSTEM AND PROGRAM PRODUCT FOR INVALIDATING A RANGE OF SELECTED STORAGE TRANSLATION TABLE ENTRIES

CROSS-REFERENCE TO RELATED APPLICATION

This application is a division of U.S. patent application Ser. No. 10/435,919 "INVALIDATING STORAGE, CLEARING BUFFER ENTRIES AND AN INSTRUCTION THEREFOR", Slegel et al., filed May 12, 2003.

FIELD OF THE INVENTION

This invention relates, in general, to processing within a computing environment, and in particular, to one or more of invalidating storage, clearing buffer entries and an instruction therefore.

BACKGROUND OF THE INVENTION

Existing computing environments use virtual storage which is normally maintained in auxiliary storage to increase the size of available storage. When a page of virtual storage is referenced, the virtual address used in referencing the page is translated by dynamic address translation to a real storage address. If the translation is successful, then the virtual storage is valid; otherwise, it is invalid. A page of virtual storage is indicated as valid or invalid by an invalid bit in a page table entry, which entry includes a real storage address if the page is valid.

Pages of storage can be invalidated a page at a time. For instance, in a computing environment based on the z/Architecture™, offered by International Business Machines Corporation, an instruction, referred to as an Invalidate Page Table Entry (IPTE) instruction, is used to invalidate a page of storage. Invalidation includes setting an invalid indicator in a control structure, associated with virtual storage and located in physical main storage, to indicate that a virtual address of a location in the virtual storage cannot be translated by dynamic address translation to a physical main storage address, also called a real address. Further, the instruction is used to clear internal machine buffer entries associated with the page, which entries may be used during dynamic address translation to avoid accessing the control structures in physical main storage. For instance, in the z/Architecture, there are Translation Lookaside Buffers used during dynamic address translation of virtual addresses to real addresses. When a page of storage is invalidated, the corresponding buffers are also cleared of entries associated with that page.

There are also instructions that enable the purging of entire Translation Lookaside Buffers. For instance, in the z/Architecture, an instruction, referred to as a Compare and Swap and Purge (CSP) instruction, purges all entries of Translation Lookaside Buffers.

Thus, although there are instructions to invalidate a page of storage and clear buffers of entries associated with that page, and instructions to clear entire buffers, there still exists a need for instructions that can selectively invalidate various sizes of units of storage and/or clear buffers of entries associated therewith. For example, a need exists for an instruction that enables the specification of a selected unit of storage greater than a page to be invalidated and/or have buffer entries associated therewith cleared. A further need exists for an instruction that enables the clearing of buffer entries for selected units of storage, without affecting buffer entries for other units of storage.

SUMMARY OF THE INVENTION

The shortcomings of the prior art are overcome and additional advantages are provided through the provision of a method of invalidating storage of a computing environment. The method includes, for instance, specifying, via an instruction, a unit of storage to be invalidated, the unit of storage including a plurality of pages of storage; and invalidating the unit of storage.

In a further aspect of the present invention, a method of invalidating storage of a computing environment is provided. The method includes, for instance, specifying a unit of storage to be invalidated, the unit of storage including a plurality of pages of storage, and wherein the specifying includes providing a descriptor of the unit of storage; and invalidating the unit of storage.

In another aspect of the present invention, a method of facilitating the clearing of buffers of a computing environment is provided. The method includes, for instance, identifying a unit of storage for which clearing of one or more entries of one or more buffers is to be performed, wherein the unit of storage includes a plurality of pages of storage; and clearing one or more entries of the one or more buffers associated with the identified unit of storage, wherein one or more entries associated with another unit of storage are not cleared.

In yet a further aspect of the present invention, an instruction to be executed within a computing environment is provided. The instruction includes, for instance, an operation code to identify an instruction to be executed; an invalidation designation to specify information associated with a unit of storage to be invalidated, the unit of storage including a plurality of pages of storage; another designation to specify additional information for use by the instruction; and a clearing designation to specify information associated with one of the unit of storage and another unit of storage for which one or more entries of one or more buffers are to be cleared, wherein one or more components of one or more of the invalidation designation, the another designation and the clearing designation are configurable as no-operations.

In another aspect of the present invention, an instruction to be executed within a computing environment is provided. The instruction includes, for instance, an operation code to identify an instruction to be executed; and at least one of the following: a first invalidation designation to specify information associated with a unit of storage to be invalidated, the unit of storage including a plurality of pages of storage; a second invalidation designation to specify additional information associated with the unit of storage to be invalidated; and a clearing designation to specify information associated with one of the unit of storage and another unit of storage for which one or more entries of one or more buffers are to be cleared, wherein the information specified by the clearing designation is not associated with at least one other unit of storage for which one or more entries are not to be cleared.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS OF THE INVENTION

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE PREFERED EMBODIMENTS

In accordance with an aspect of the present invention, a specified portion of storage (e.g., virtual storage) is invalidated. As examples, a segment of storage, which includes a plurality of pages of storage, or a region of storage, which includes a plurality of segments of storage, is selected to be invalidated. The invalidation is facilitated by the setting of invalidation indicators located in data structure entries corresponding to the units of storage to be invalidated. In a further aspect of the present invention, buffer entries (e.g., Translation Lookaside Buffer entries) associated with the storage being invalidated, or other storage, are cleared. Yet further, in another aspect of the present invention, buffer entries associated with selected address spaces are cleared from buffers without affecting buffer entries of non-selected address spaces, and without performing invalidation. In one example, an instruction, referred to herein as an Invalidate Dynamic Address Translation (DAT) Table Entry (IDTE) instruction, from the IBM® z/Architecture is used to perform one or more of the above operations.

Figure 1:
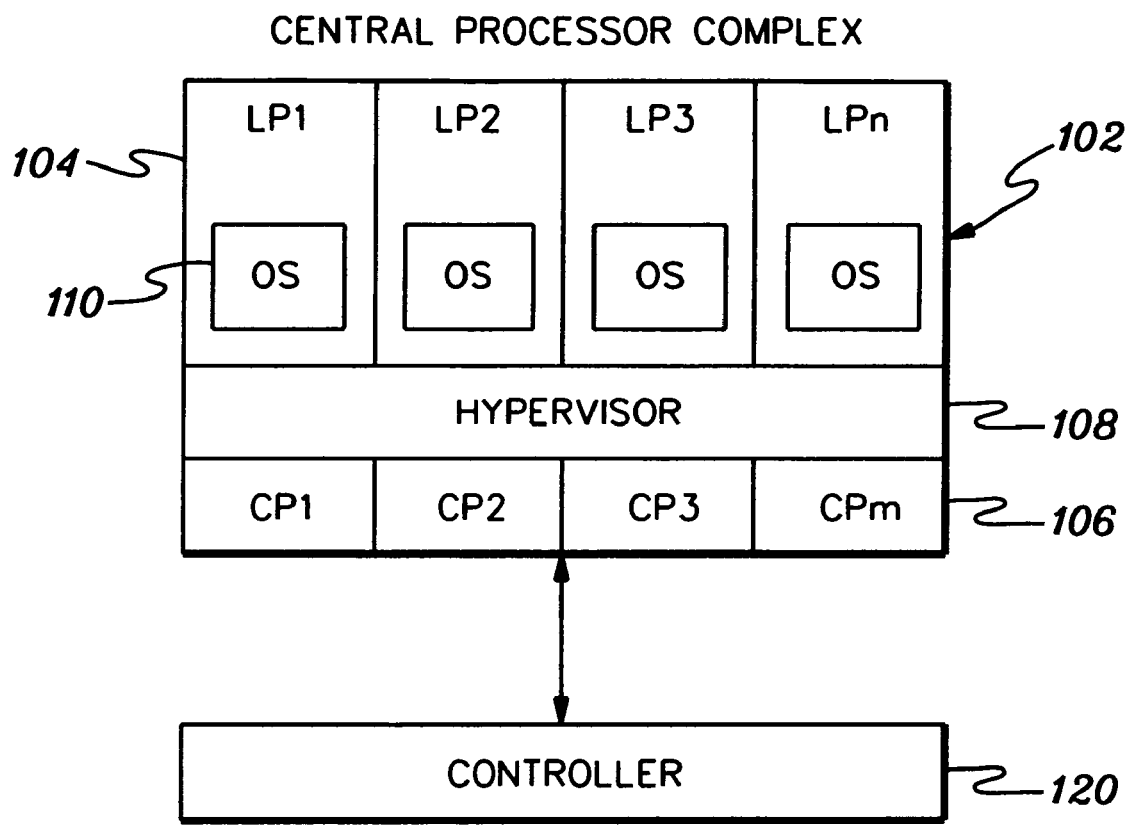
FIG. 1 depicts one embodiment of a computing environment incorporating and using one or more aspects of the present invention.

One embodiment of a computing environment 100 incorporating and using one or more aspects of the present invention is described with reference to FIG. 1. Computing environment 100 is based, for instance, on the z/Architecture offered by International Business Machines Corporation, Armonk, N.Y. The z/Architecture is described in an IBM® publication entitled, "z/Architecture Principles of Operation," IBM Publication No. SA22-7832-00, December 2000, which is hereby incorporated herein by reference in its entirety. (IBM® is a registered trademark of International Business Machines Corporation, Armonk, N.Y., U.S.A. Other names used herein may be registered trademarks, trademarks or product names of International Business Machines Corporation or other companies.) In one example, a computing environment based on the z/Architecture includes an eServer® zSeries®, offered by International Business Machines Corporation, Armonk, N.Y.

As one example, computing environment 100 includes a central processor complex (CPC) 102 coupled to a controller 120. Central processor complex 102 includes, for instance, one or more partitions 104 (e.g., logical partitions LP1–LPn), one or more central processors 106 (e.g., CP1–CPm), and a hypervisor 108 (e.g., a logical partition manager), each of which is described below.

Each logical partition 104 is capable of functioning as a separate system. That is, each logical partition can be independently reset, initially loaded with an operating system, if desired, and operate with different programs. An operating system or application program running in a logical partition appears to have access to a full and complete system, but in reality, only a portion of it is available. A combination of hardware and Licensed Internal Code (commonly referred to as microcode) keeps a program in a logical partition from interfering with a program in a different logical partition. This allows several different logical partitions to operate on a single or multiple physical processors in a time sliced manner. In this particular example, each logical partition has a resident operating system 110, which may differ for one or more logical partitions. In one embodiment, operating system 110 is the z/OS® operating system, offered by International Business Machines Corporation, Armonk, N.Y.

Central processors 106 are physical processor resources that are allocated to the logical partitions. For instance, a logical partition 104 includes one or more logical processors, each of which represents all or a share of a physical processor resource 106 allocated to the partition. The logical processors of a particular partition 104 may be either dedicated to the partition, so that the underlying processor resource is reserved for that partition; or shared with another partition, so that the underlying processor resource is potentially available to another partition.

Logical partitions 104 are managed by hypervisor 108 implemented by microcode running on processors 106. Logical partitions 104 and hypervisor 108 each comprise one or more programs residing in respective portions of central storage associated with the central processors. One example of hypervisor 108 is the Processor Resource/Systems Manager (PR/SM), offered by International Business Machines Corporation, Armonk, N.Y.

Controller 120, which is coupled to the central processor complex, includes centralized logic responsible for arbitrating between different processors issuing requests. For instance, when controller 120 receives a request, it determines that the requester is the master processor for that request and that the other processors are slave processors; it broadcasts messages; and otherwise, handles requests. One example of a controller is described in U.S. Pat. No. 6,199,219, entitled "System Serialization with Early Release of Individual Processor," Webb et al., Sep. 12, 2000, which is hereby incorporated herein by reference in its entirety. Further details are also described with reference to FIG. 2.

Figure 2:
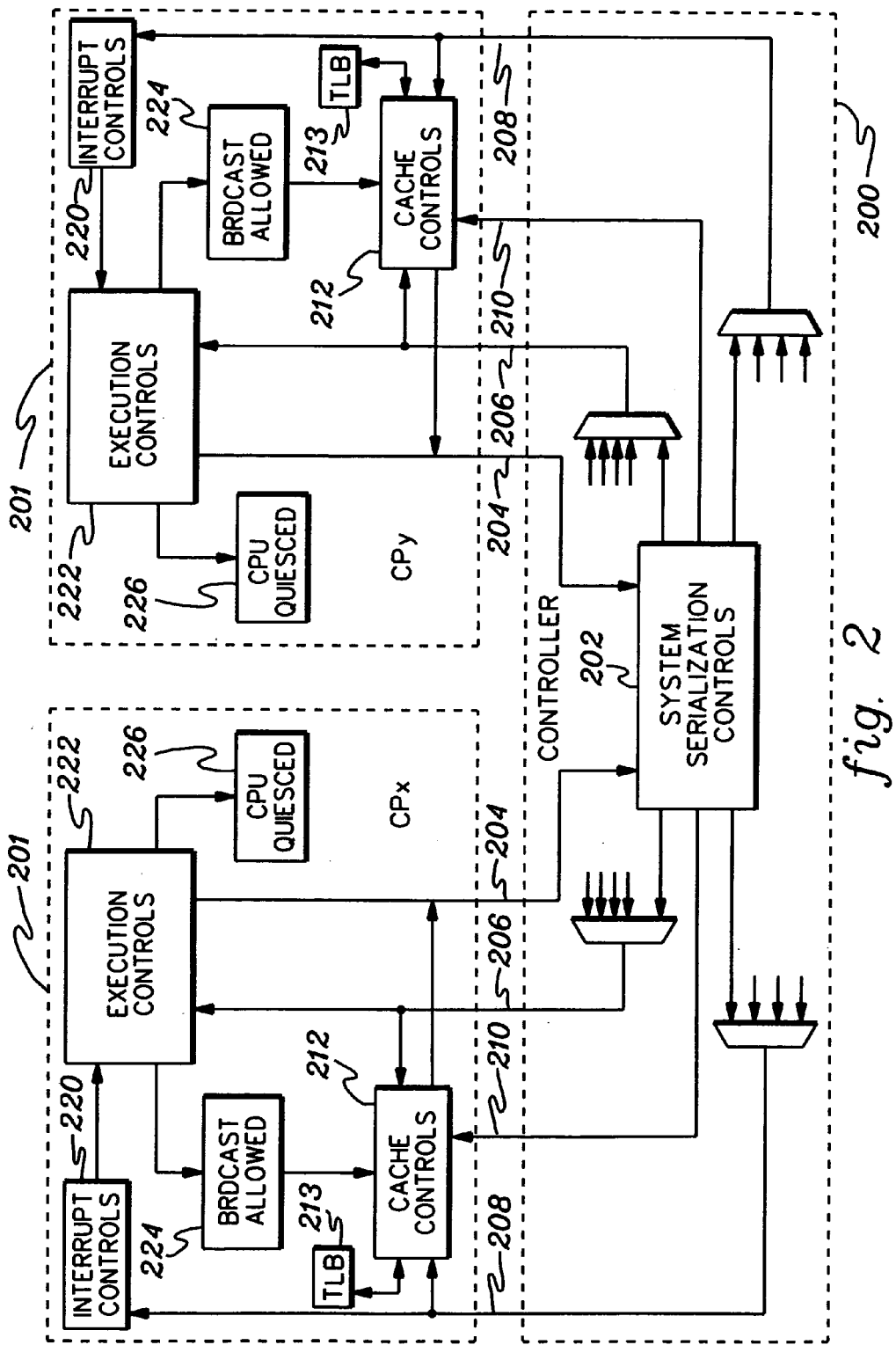
FIG. 2 depicts one embodiment of further details associated with a controller of FIG. 1, in accordance with an aspect of the present invention.

FIG. 2 depicts one example of a controller 200 coupled to a plurality of central processors (CPUs) 201. In this example, two central processors are depicted. However, it will be understood that more than two processors may be coupled to controller 200.

Controller 200 includes various controls including, for instance, system serialization controls 202. The system serialization controls are used to ensure that operations that are to be serialized, such as invalidate instructions, are serialized, in that only one such instruction is in progress at one time in the computing environment. It also monitors the sequence of events for that operation.

Controller 200 is coupled to each central processor via various interfaces. For instance, an interface 204 is used by the Licensed Internal Code in a central processor to send "control" commands to the controller, which specify an action to be taken, and to send "sense" commands, which return information from the controller. Another interface is a response bus 206, which is used to return information from the controller for the "sense" commands. The response bus is also used to communicate command status for "control" commands, and may be set from a plurality of sources within the controller, including the system serialization controls. A central processor can use this interface to sense the state of the system serialization controls in controller 200.

A further interface is interface 208, which is used by the controller to send commands to each CPU. This may also be controlled from a plurality of sources within the controller, including system serialization controls 202. A yet further interface is interface 210, which provides signals to cache controls 212 of central processor 201. Cache controls 212 process commands, in response to the signals. In one example, cache controls 212 process commands that affect one or more buffers, such as Translation Lookaside Buffers (TLBs) 213, as described in further detail below.

In addition to cache controls 212, central processor 201 includes various other controls, including, for instance, interrupt controls 220 and execution controls 222. In response to particular events, interrupt controls 220 cause an internal interruption to be pending in the CPU, which in turn, causes execution controls 222 to suspend program instruction processing, at the next interruptible point. In response to the interruption, execution controls 222 invokes a Licensed Internal Code routine to set a broadcast operation allowed latch 224 to enable cache controls 212 to process pending commands.

Central processor 201 also includes a CPU quiesced latch 226 that indicates whether or not the central processor is quiesced.

The above-described computing environment is only one example. Many variations are possible without departing from the spirit of the present invention. For example, one or more partitions can be running in different architecture modes. Further, as another example, the environment need not be based on the z/Architecture, but instead, can be based on other architectures. Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

Further details of an emulation environment are described with reference to FIG. 3. As one example, a host computer 300 is capable of emulating another architecture, computer and/or processing capabilities of another computer. For instance, host computer 300 is based on a RISC architecture, such as PowerPC, or another architecture, and is capable of emulating an architecture.

Host computer 300 includes, for instance, a memory 302 to store instructions and data; an instruction fetch unit 304 to fetch instructions from memory 302, and to optionally, provide local buffering for the fetched instructions; an instruction decode unit 306 to receive instructions from instruction fetch unit 304 and to determine the type of instructions that have been fetched; and an instruction execution unit 308 to execute the instructions. Execution may include loading data into a register from memory 302; storing data back to memory from a register; or performing some type of arithmetic or logical operation, as determined by the decode unit.

In one example, each unit described above is implemented in software. For instance, the operations being performed by the units are implemented as one or more subroutines within emulator software. In another example, one or more of the operations are implemented in firmware, hardware, software or some combination thereof.

Figure 3:
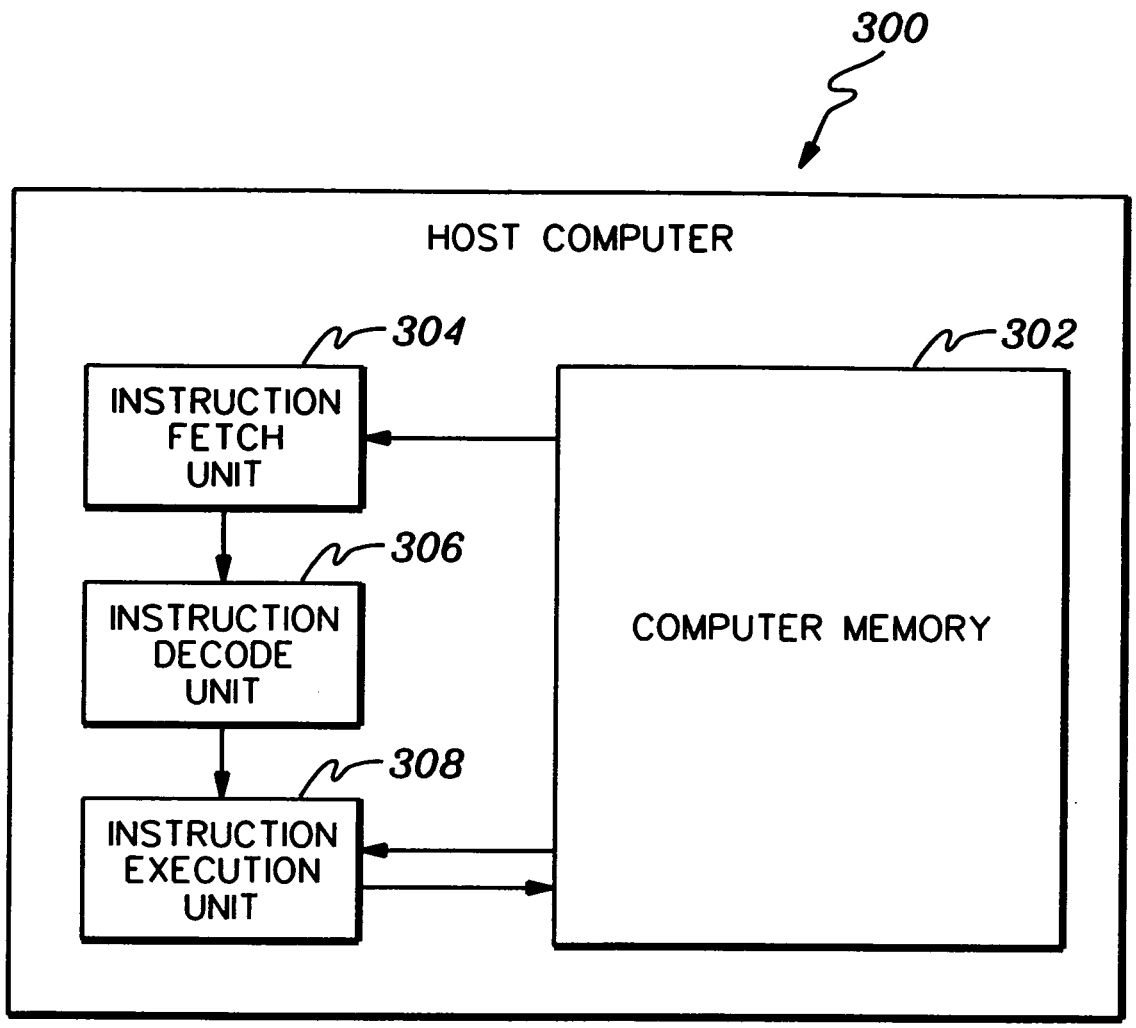
FIG. 3 depicts one embodiment of a host computer that can emulate another computer, in accordance with an aspect of the present invention.

Further, although FIG. 3 is described with reference to emulation, the environment of FIG. 3 need not be an emulation environment. In another example, instructions are executed in a native environment, and the operations are implemented in hardware, firmware, software or some combination thereof.

A computing environment may include virtual storage, as well as main storage. Virtual storage may far exceed the size of main storage available in the configuration and is normally maintained in auxiliary storage. Virtual storage is considered to be composed of blocks of addresses, called pages. The most recently referred to pages of virtual storage are assigned to occupy blocks of physical main storage. As a user refers to pages of virtual storage that do not appear in main storage, the virtual pages are brought in to replace the pages in main storage that are less likely to be used. The swapping of pages in storage may be performed by the operating system without the user's knowledge.

The addresses used to designate locations in virtual storage are referred to as virtual addresses. A block of sequential virtual addresses spanning, for instance, up to 4 k bytes, is referred to as a page. Similarly, a block of sequential virtual pages spanning, for instance, up to 1 M bytes is referred to as a segment; and a block of sequential virtual segments spanning, for instance, up to 2 G bytes, is referred to as a region. Further, a sequence of virtual addresses associated with virtual storage pointed to by an address space control element (ASCE) is called an address space. Address spaces may be used to provide degrees of isolation between users. An address space can include one or more regions, one or more segments, one or more pages, or some combination thereof.

Associated with the different types of units of storage (e.g., regions, segments, pages) are data structures to be used in processing associated with the units of storage. For example, associated with regions are region tables; associated with segments are segment tables; and associated with pages are page tables. These tables are used, for instance, during translation (e.g., Dynamic Address Translation) of a virtual address to a real address that is used to access main storage. The tables to be used in translation, referred to herein as translation tables, are designated by an address space control element (ASCE). This is described in further detail in an IBM® publication entitled, "z/Architecture Principles of Operation," IBM Publication No. SA22-7832-00, December 2000, which is hereby incorporated herein by reference in its entirety. A unit of virtual storage that is not currently assigned to main storage is called invalid. The invalid state of a unit of virtual storage is indicated by an invalid indicator in the data structure associated with the unit.

The dynamic address translation mechanism is implemented, in one embodiment, such that the information derived from the translation tables (e.g., region tables, segment tables and/or page tables) through the DAT process is maintained in one or more buffers located within the processors, referred to herein as Translation Lookaside Buffers, in order to enhance performance of address translation. That is, during the translation, the buffers are checked for the needed information, and then, if the information is not in the buffers, one or more of the translation tables are accessed.

In one embodiment, a buffer entry is considered as one of three types: a TLB combined region-and-segment-table entry; a TLB page table entry; or a TLB real space entry, each of which is described below.

A TLB combined region-and-segment-table entry (CRSTE) includes both the information obtained from the table entry or entries in real or absolute storage and the attributes used to fetch this information from storage. In one example, a TLB combined region-and-segment-table entry (CRSTE) includes the following fields:

TO The table origin in the address-space-control element used to form the entry;
RX The region index of the virtual address used to form the entry;
SX The segment index of the virtual address used to form the entry;
PTO The page table origin fetched from the segment table entry in real or absolute storage;
C The common segment bit fetched from the segment table entry in real or absolute storage; and
P The page protection bit fetched from the segment table entry in real or absolute storage.
V The validity bit indicates if the entry in the TLB is valid, and therefore, can be used for looking up subsequent entries.

A TLB page table entry includes the information obtained from the table entry or entries in real or absolute storage and the attributes used to fetch this information from storage. In one example, a TLB page table entry includes:

TO The table origin in the address-space-control element or TLB combined region-and-segment-table entry used to form the entry, depending on how the entry was formed;
PTO The page table origin used to form the entry;
PX The page index of the virtual address used to form the entry;
PFRA The page-frame real address fetched from the page table entry in real or absolute storage; and
P The page protection bit fetched from the page table entry in real or absolute storage.
V The validity bit indicates if the entry in the TLB is valid, and therefore, can be used for looking up subsequent entries.

At times, a unit of storage is to be invalidated. To facilitate this invalidation, the translation table associated with that storage unit is employed, as described herein. Further, responsive to invalidating the storage, corresponding buffer entries may also be cleared. For example, in order to invalidate a page of storage, an invalid bit of a page table entry is set. Additionally, in one example, the corresponding entries in one or more TLBs are atomically cleared. In one particular example, the invalidation and clearing of entries associated with pages of storage are performed by an Invalidate Page Table Entry (IPTE) instruction.

Figure 4:
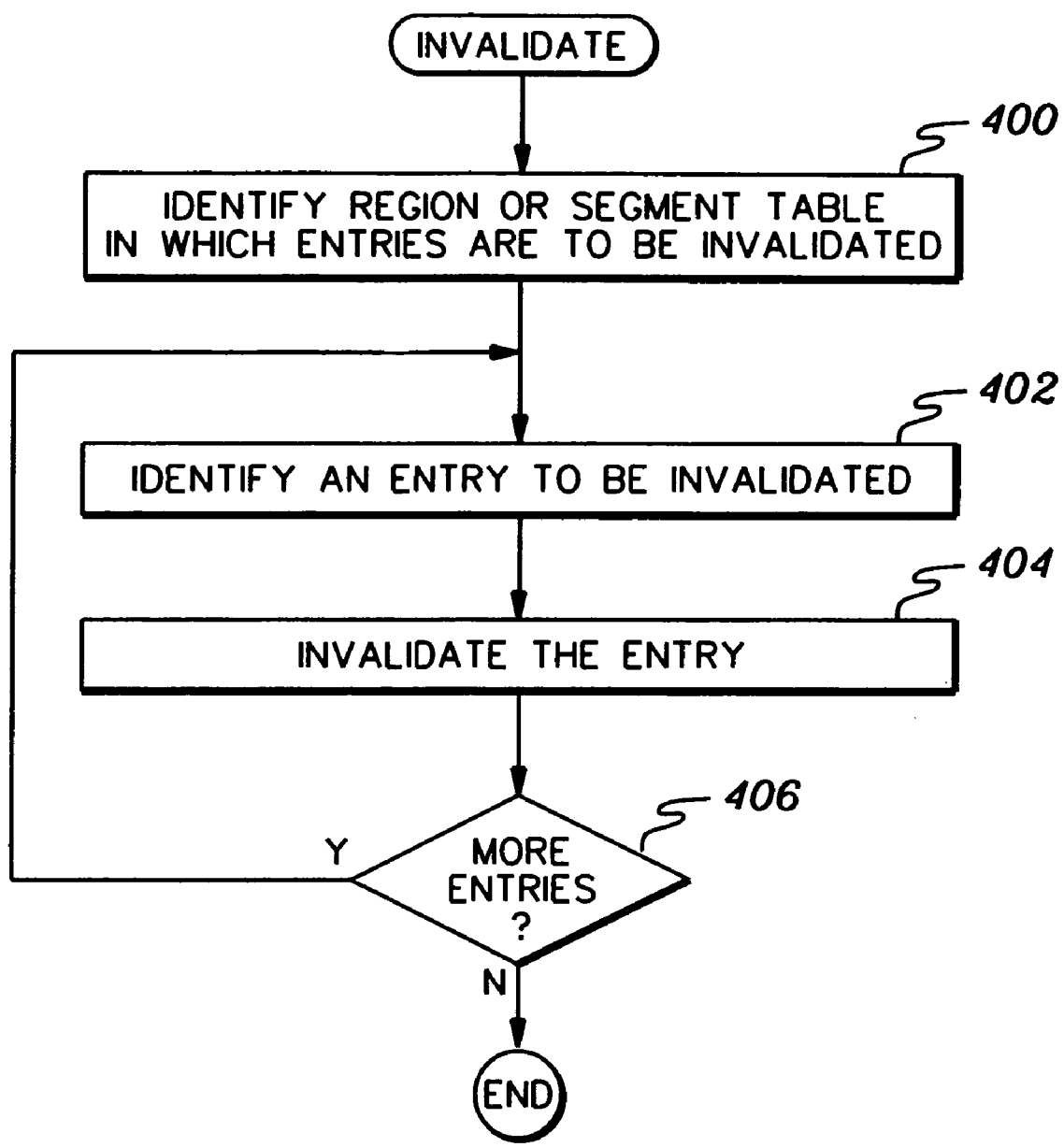
FIG. 4 depicts one embodiment of the logic associated with invalidating storage, in accordance with an aspect of the present invention.

In addition to invalidating pages of storage, in accordance with an aspect of the present invention, segments of storage and/or regions of storage may be invalidated. As one example, segment and/or region tables are used in this invalidating. One embodiment of the logic associated with invalidating a particular unit of storage is described with reference to FIG. 4.

Initially, a region or segment table in which one or more entries is to be invalidated is identified, STEP 400. In one example, this includes the providing of a region table origin or a segment table origin. Then, an entry within the designated region or segment table is identified for invalidation, STEP 402, and the entry is invalidated, STEP 404. In one example, the identification is done by providing a region index or segment index (bits of a virtual address) that selects an entry within the identified table, and the invalidation includes setting an invalid indicator within the entry. Responsive to setting the invalid indicator, a corresponding unit of storage (e.g., a region or segment) is invalidated.

Thereafter, a determination is made as to whether there are more entries to be invalidated, INQUIRY 406. If there are more entries to be invalidated, then processing continues with STEP 402. Otherwise, processing is complete.

Figure 5:
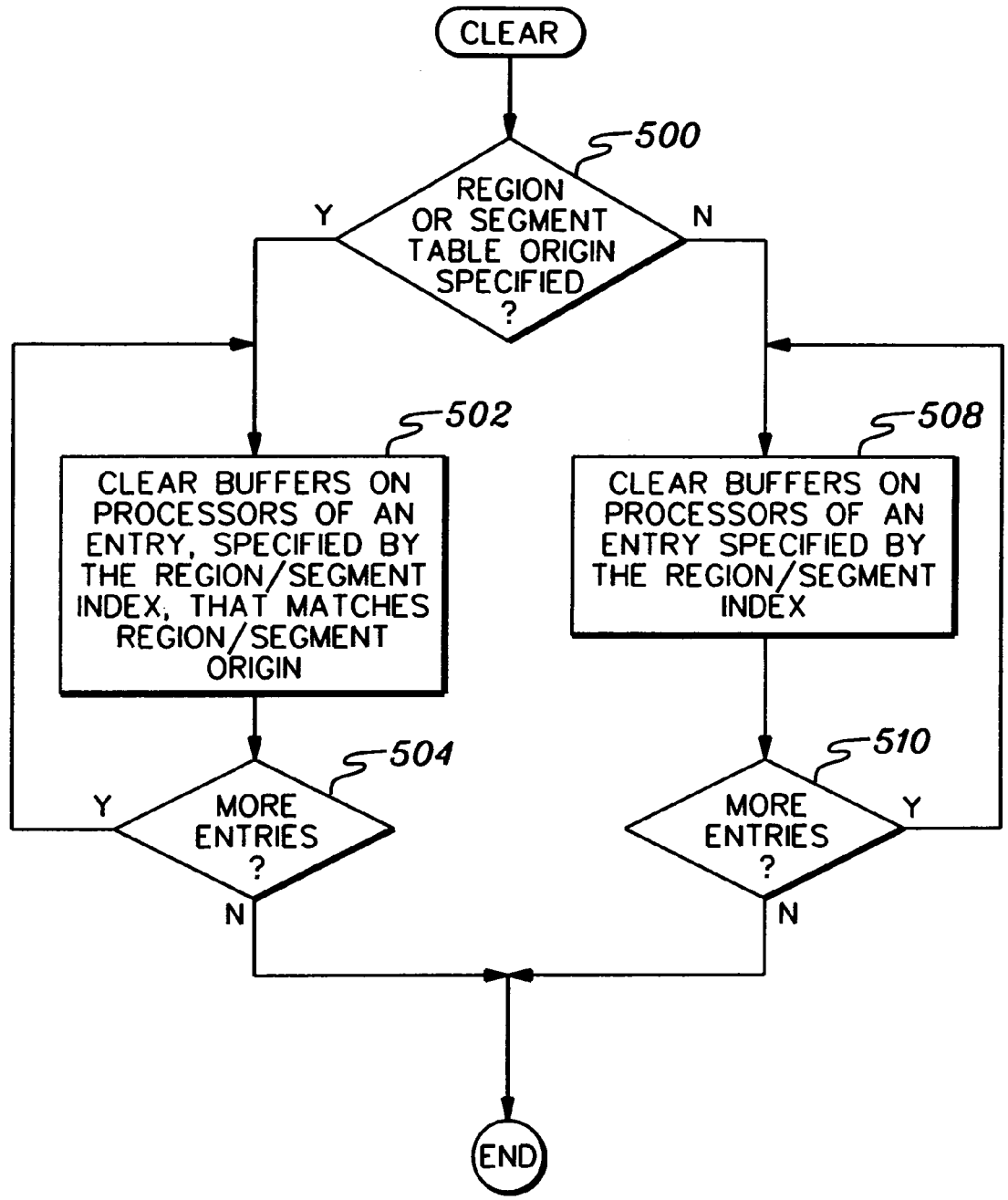
FIG. 5 depicts one embodiment of the logic associated with clearing buffer entries, in accordance with an aspect of the present invention.

In addition to invalidating the one or more entries in a region or segment table and thus invalidating those units of storage, the corresponding entries (or other entries) may be cleared or purged from one or more buffers on one or more processors within the environment. One embodiment of the logic associated with this clearing is described in further detail with reference to FIG. 5.

Initially, a determination is made as to whether a region or segment table origin is being specified, INQUIRY 500. If a region or segment table origin is specified, then one or more buffers are cleared of an entry specified by the region or segment index that matches the region or segment origin, STEP 502. Subsequently, a determination is made as to whether there are more entries to be cleared, INQUIRY 504. If so, then processing continues with STEP 502. Otherwise, processing is complete.

Returning to INQUIRY 500, if the region or segment table origin is not specified, then one or more buffers are cleared of an entry specified by the region or segment index, STEP 508. Thereafter, a determination is made as to whether there are more entries to be cleared, INQUIRY 510. If there are more entries to be cleared, then processing continues with STEP 508. Otherwise, processing is complete.

In one example, the invalidation and clearing are performed by one instruction. The instruction invalidates the selected entries of a segment or region table and atomically purges at least the corresponding entries (or other entries) from the TLBs on the processors of the configuration. In one example, the entries are purged from all TLBs on all processors, whether physical, virtual or emulated by software. If a multi-level TLB structure exists, then all levels are purged, in one example. If multiple logical partitions exist in the system, then TLB entries on this and other processors that were formed for the logical partition that the current IDTE instruction is being executed in, are purged.

This instruction can be implemented in many architectures and may be emulated. As examples, the instruction can be executed in hardware by a processor; or by emulation of the instruction set including this instruction, by software executing on a computer having a different native instruction set. In one particular example, the instruction is implemented in the z/Architecture, and is referred to herein as an Invalidate Dynamic Address Translation (DAT) Table Entry (IDTE) instruction.

IDTE provides, for instance, an invalidation and clearing option, in which one or more regions or segments of storage are invalidated via one or more entries of a region table or segment table, and at least the corresponding entries (or other entries) from the TLBs (e.g., all the TLBs) in the configuration are purged. The instruction specifies a minimum set of TLB entries to be purged. In a further implementation, more or even all TLB entries may be purged upon execution of the IDTE instruction.

Figure 6A:
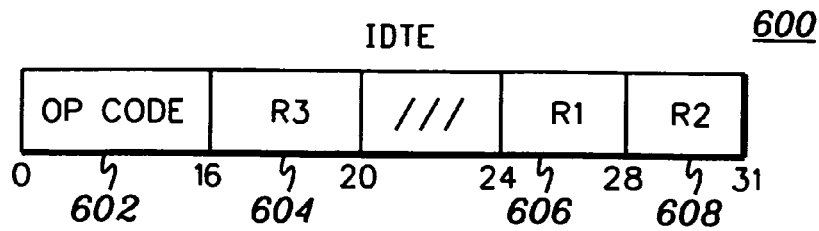
FIG. 6A depicts one embodiment of a format of an Invalidate Dynamic Address Translation Table Entry (IDTE) instruction, in accordance with an aspect of the present invention.

One embodiment of the format of an Invalidate DAT Table Entry (IDTE) instruction is described with reference to FIG. 6A. In one example, an IDTE instruction 600 includes, for instance, an operation code 602 designating the Invalidate DAT Table entry instruction (e.g., 'B98E'x), and a plurality of registers 604–608. Each of the registers is described in further detail below with reference to FIGS. 6B–6D.

Figure 6B:
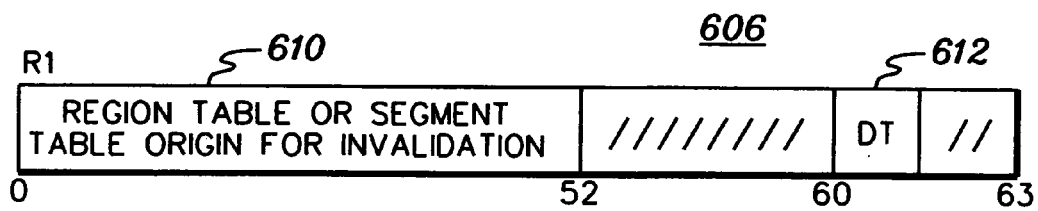
FIG. 6B depicts one embodiment of the fields associated with general register R1 of the IDTE instruction of FIG. 6a, in accordance with an aspect of the present invention.
Figure 6C:
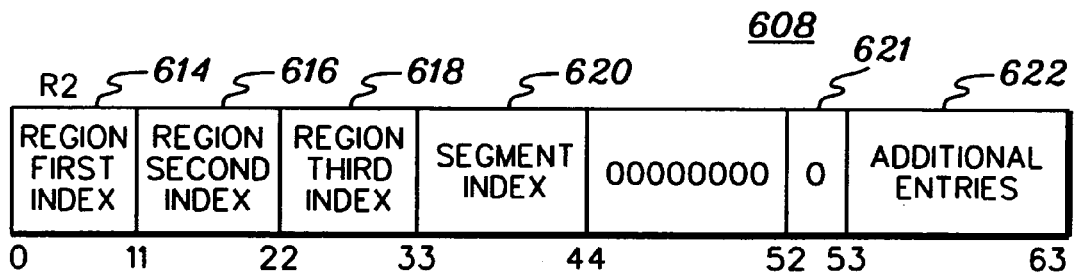
FIG. 6C depicts one embodiment of the fields associated with general register R2 of the IDTE instruction of FIG. 6a, in accordance with an aspect of the present invention.
Figure 6D:
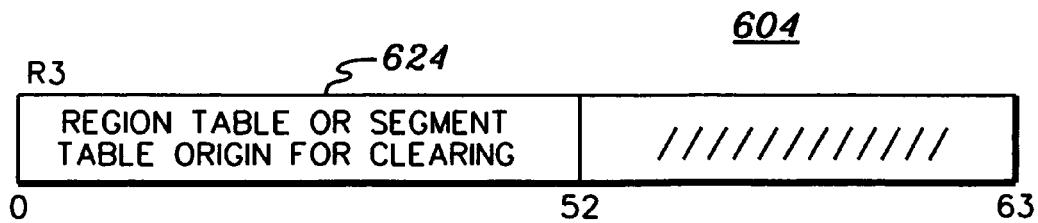
FIG. 6D depicts one embodiment of the fields associated with general register R3 of the IDTE instruction of FIG. 6a, in accordance with an aspect of the present invention.

Referring to FIG. 6B, register 606, which is general register R1, has, for instance, a format of an address space control element with a table origin (e.g., bits 0–51), and a designation type control (bits 60 and 61) used. Bits 52–59, 62 and 63 are ignored. In particular, R1 includes, for instance, a region table or segment table origin for invalidation 610, which designates the translation table of which one or more entries are to be invalidated; and a designation type control (DT) 612, which specifies the type of that table (e.g., region table or segment table).

Register 608 (FIG. 6C), which is general register R2, includes a region first index 614, specifying a first level region table; a region second index 616, specifying a second level region table; and a region third index 618, specifying a third level region table. That is, to accommodate large virtual addresses, three levels of region tables are used. Register R2 also includes a segment index 620, which is an index into a segment table; a mode indicator 621, which determines the function to be performed; and an additional entries indicator 622, which indicates how many entries are to be invalidated. For example, bits 53–63 of general register R2 include a binary integer specifying the number of additional table entries to be invalidated. In one example, the number of entries to be invalidated is 1–2048, corresponding to a value in bits 53–63 of 0–2047. Bits 44–51 of general register R2 are zeros; otherwise, a specification exception is recognized. Thus, bits 0–43 of general register R2 have the format of the region index and segment index of a virtual address. The part of bits 0–43 used by DAT to select an entry in the type of table designated by general register R1 is called an Effective Invalidation Index, and is described in further detail below.

Register 604 (FIG. 6D), which is general register R3, has, for instance, a format of an address-space-control element with the table origin, bits 0–51, being used, if it is non-zero. This table origin is used to select TLB entries to be cleared, and the type of table it designates is independent of bits 60 and 61 of general register R1. Bits 52–63 of general register R3 are ignored. If R3 is zero, the entire contents of general register 0 are ignored. In one example, the entries to be cleared can be the same or different than the entries that are invalidated.

One embodiment of the logic associated with an invalidation and clearing operation is described with reference to FIGS. 7A–7B. In one example, an invalidation and clearing operation is specified when bit 52 of general register R2 is zero. With this operation, the designated region table entry or segment table entry in storage, or a range of entries beginning with the designated entry, is invalidated, and the translation lookaside buffers (TLBs) in the CPUs of the configuration are cleared of the associated entries (or other entries). In one example, all levels of the buffers, if they are multi-level, in all CPUs are cleared.

Figure 7A:
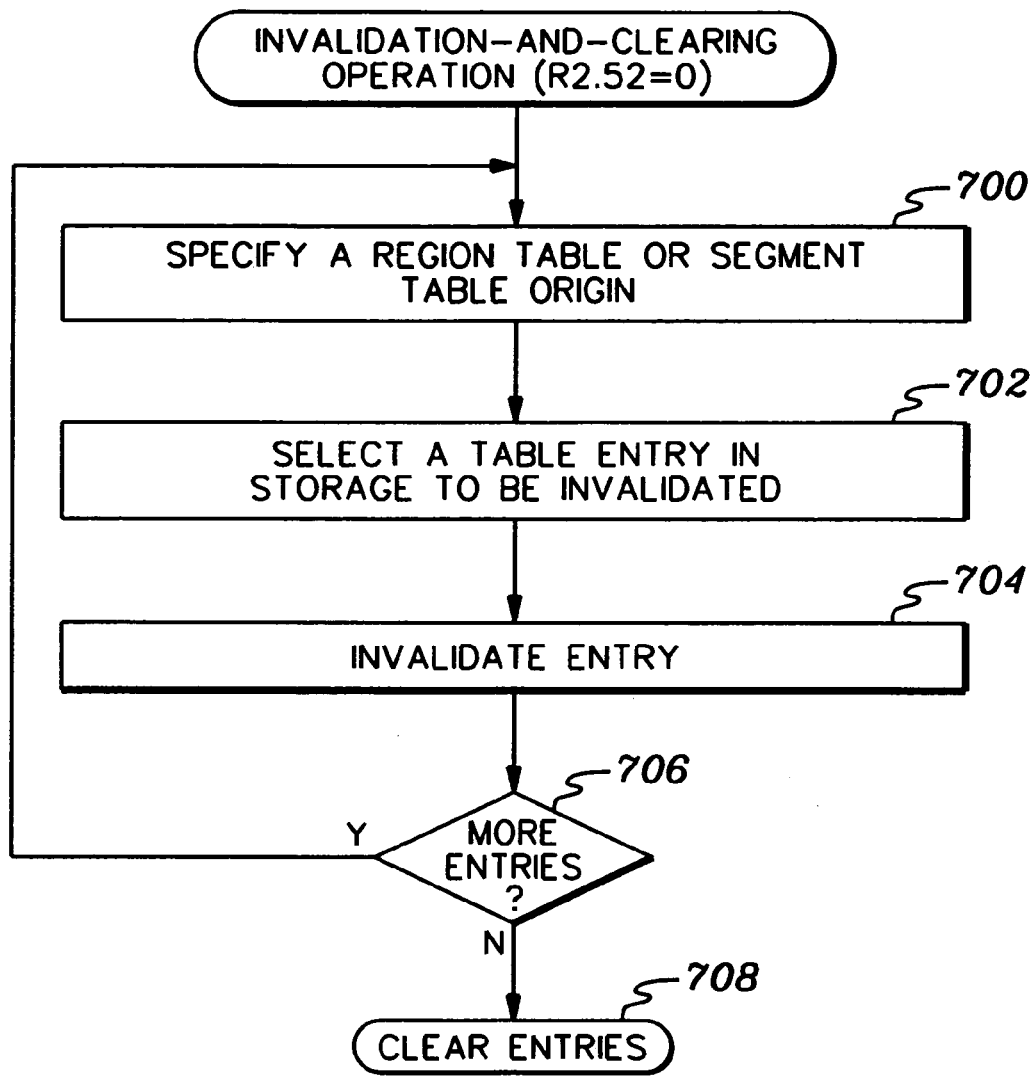
FIGS. 7A–7B depict one embodiment of the logic associated with the IDTE instruction, in accordance with an aspect of the present invention.

Referring to FIG. 7A, initially, a region table or segment table origin designating a region table or segment table from which one or more entries are to be invalidated is specified, STEP 700. In one example, this is specified in general register R1. Additionally, a table entry in storage to be invalidated is selected, STEP 702. In one example, a table entry is designated by adding the table origin in general register R1 and the effective invalidation index in general register R2 and following various rules, as described herein.

Bits 60 and 61 of general register R1 specifies a table type and an effective invalidation index, as follows:

| Bits 60 and 61 of Reg. R1 | Table Type | Effective invalidation Index in Reg. R2 |
|---|---|---|
| 11 | Region first table | Region first index (bits 0–10) |
| 10 | Region second table | Region second index (bits 11–21) |
| 01 | Region third table | Region third index (bits 22–32) |
| 00 | Segment table | Segment index (bits 33–43) |

(The part of bits 0–43 to the right of the effective invalidation index is ignored.)

With reference to the above table, when bits 60 and 61 have the value 11 binary, the region first index portion of R2, in conjunction with the region first table origin of R1, is used to select an entry in a region first table. The table origin is treated as a 64-bit address.

The 64-bit address of the region first table entry in real or absolute storage is obtained by appending twelve zeros to the right of bits 0–51 of the region first table designation and adding the region first index with three rightmost and fifty leftmost zeros appended. This addition is performed according to the rules for 64-bit address arithmetic, regardless of the current addressing mode, specified by bits 31 and 32 of the current Program Status Word (PSW). When a carry out of bit position zero occurs during the addition, it is ignored. The address formed from these two components is a real or absolute address. All 64 bits of the address are used regardless of whether the current PSW specifies the 24-bit, 31-bit or 64-bit addressing mode.

In one example, the entire region first table entry is fetched concurrently from storage, as observed by other CPUs. The fetch access to the entry is subject to key-controlled protection, and the store access is subject to key-controlled protection and low-address protection. When the storage address generated for fetching the region first table entry designates a location which is not available in the configuration, an addressing exception is recognized and the unit of operation is suppressed.

When bits 60 and 61 have the value 10 binary, the region second index of R2, in conjunction with the region second table origin of R1, is used to select an entry from the region second table. The region second table lookup process is similar to the region first table lookup process. When no exceptions are recognized, the entry fetched from the region second table designates the beginning and specifies the offset and length of the corresponding region third table.

When bits 60 and 61 have the value of 01 binary, the region third index portion of R2, in conjunction with the region third table origin of R1, is used to select an entry from the region third table. The region third table lookup process is similar to the region first table lookup process. When no exceptions are recognized, the entry fetched from the region third table designates the beginning and specifies the offset in length of the corresponding segment table.

When bits 60 and 61 have the value 00 binary, the segment index portion of R2, in conjunction with the segment table origin of R1, is used to select an entry from the segment table. The segment table lookup process is similar to the region first table lookup process. When no exceptions are recognized, the entry fetched from the segment table designates the beginning of the corresponding page table.

The entire table entry is fetched concurrently from storage, in one example. Subsequently, the entry is invalidated, STEP 704. In one example, the entry is invalidated by setting bit 58 of the entry to 1 binary. By invalidating this entry, the corresponding unit of storage is invalidated.

Thereafter, a determination is made as to whether more entries are to be invalidated, INQUIRY 706. In one example, this determination is made by checking bits 53–63 of general register R2. If bits 53–63 of general register R2 are not all zeros, then more entries are to be invalidated. Thus, a 1 is added to the previous used value of the effective invalidation index and processing continues with STEP 700. This is repeated so that a number of entries one more than the number specified by bits 53–63 are invalidated. A carryout of the leftmost bit position of the effective invalidation index is ignored, and wraparound in the table occurs in this case. The contents of general register R2 remain unchanged.

Subsequent to invalidating the one or more entries, in accordance with a further aspect of the present invention, this CPU clears selected entries from its TLB and signals the other CPUs in the configuration to clear selected entries from their TLBs, STEP 708. In one example, each TLB is cleared of at least those Combined Region and Segment Table entries (CRSTEs) that meet the following conditions:

The effective invalidation index and the bits to the left of it in general register R2, and the same part of the region-and-segment-index field in the TLB entry, match. (In one embodiment, if these fields include segment-index fields, either CRSTEs may be cleared regardless of their region-index fields or all CRSTEs may be cleared. If the fields do not include segment-index fields, all CRSTEs may be cleared.) Note that when multiple table entries are invalidated due to bits 53–63 of general register R2, then the effective invalidation index is incremented, and a carry out of the left-most bit position of the index is lost.

Either R3 is zero or the table-origin field in general register R3 matches the table-origin field in the TLB entry.

If the invalidated entry is a segment-table entry, the page-table-origin field in the invalidated entry matches the page-table-origin field in the TLB entry. (In one embodiment, a TLB entry may be cleared regardless of the page-table origin in the entry.)

Each TLB is also cleared of at least those page table entries in which the page-table-origin field matches the page-table-origin field in (1) the invalidated segment-table entry, if a segment-table entry was invalidated, or (2) any combined region-and-segment-table entry that was cleared (it is in the set that is to be cleared) in the same TLB. (In another embodiment, the implementation may clear a page-table entry regardless of the page table origin in the entry. That is, it may clear all page table entries.)

One embodiment of the logic associated with clearing entries from a TLB is described with reference to FIG. 7B As one example, this is a continuation of the processing performed by IDTE, and it is performed atomically to the invalidation as observed by this CPU and other CPUs in the system.

Figure 7B:
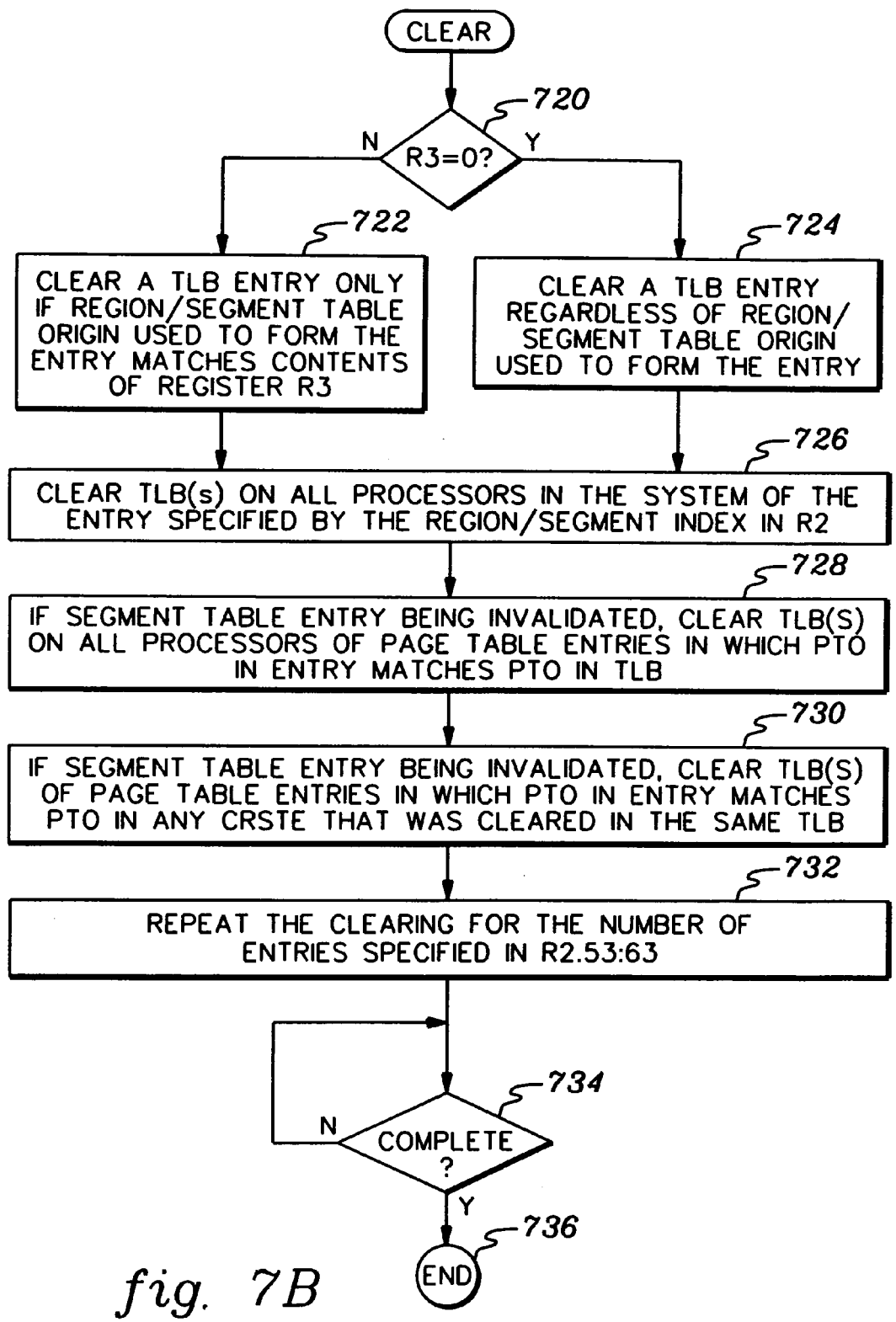

Referring to FIG. 7B, initially a determination is made as to whether R3 is zero, INQUIRY 720. If R3 is nonzero, then a region table or segment table origin for clearing is indicated in register R3 and, to clear a TLB entry, the region/segment table origin designated in register R3 is to match the region/segment table origin used to form the entry, STEP 722. If R3 is zero, the contents of register R3 (register 0) are ignored, and an entry is cleared regardless of the region/segment table origin used to form the entry, STEP 724.

The TLB is cleared on all processors in the system of those entries specified by the region/segment index specified in register R2, STEP 726. In one example, the TLB is cleared of at least those combined region and segment table entries in which, for instance, the effective invalidation index and the bits to the left of it in general register R2 and the same part of the region and segment index table in the TLB entry match. To clear an entry, the V bit is turned off, as one example.

Further, if a segment table entry is being invalidated, then the TLBs on all processors in the system are cleared of page table entries in which the page table origin in the entry is equal to the page table origin in the TLB, STEP 728. Further, if a segment table entry is being invalidated, TLBs are cleared of at least those page table entries in which the page table origin field matches the page table origin field in any CRSTE that was cleared (e.g., necessarily) in the same TLB, STEP 730. This clearing process is repeated for a number of entries one more than the number specified in additional entries field 622 of FIG. 6C, STEP 732.

Thereafter, a determination is made as to whether the invalidation and clearing operation is complete, INQUIRY 734. In one example, the IDTE instruction is not complete on the issuing processor until the designated TLB entries have been cleared on that CPU and all other CPUs in the system have completed any storage accesses using the TLB entry specified in this instruction. In one example, it is the quiesce controller that indicates to this issuing processor whether the other processors have completed their accesses. That is, the issuing processor is considered the master processor and any slave processors affected by the IDTE instruction indicate to the controller their state. Responsive to the controller receiving the appropriate state from the slave processors, it indicates completion to the master. Should processing be complete, then the instruction ends, STEP 736. Otherwise, the processor waits for a predetermined amount of time and checks the status, once again, or is signaled as to completion, INQUIRY 734.

In one embodiment, storing in the region or segment table entry and the clearing of TLB entries may or may not occur if the invalid bit was already one in the region or segment table entry.

Although in the embodiment described above the clearing of the TLB entries is performed subsequent to invalidating the desired entries, in other embodiments, the clearing of TLB entries may occur after each invalidation, after a selected number of invalidations, etc.

Figure 8A:
FIG. 8A depicts one embodiment of the fields of general register R1 being used for an alternative operation of the IDTE instruction, in accordance with an aspect of the present invention.
Figure 8B:
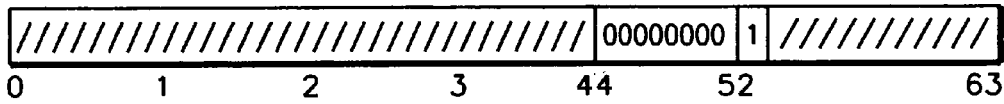
FIG. 8B depicts one embodiment of the fields of general register R2 being used for an alternative operation of the IDTE instruction, in accordance with an aspect of the present invention.
Figure 8C:
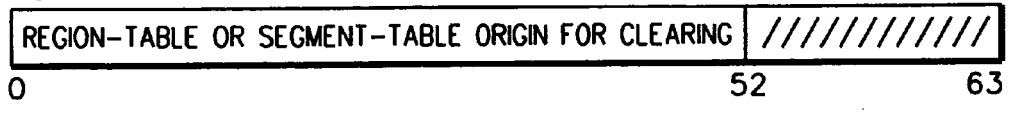
FIG. 8C depicts one embodiment of the fields of general register R3 being used for an alternative operation of the IDTE instruction, in accordance with an aspect of the present invention.

In a further aspect of the present invention, the IDTE instruction can alternatively be used to purge TLB entries associated with an address space (e.g., designated by an Address Space Control Element (ASCE)). In one example, this option is indicated by setting bit 52 of general register R2 to 1. With this option, the contents of general register R1 are ignored (see FIG. 8A), as well as bits 0–43 and 53–63 of general register R2 (see FIG. 8B). The contents of general register R3 have the format of an address space control element with the table origin, bits 0–51, being used (FIG. 8C). Bits 52–63 of general register R3 are ignored. R3 may be zero or non-zero; that is any general register including register 0 may be designated. This operation does not perform any invalidation of storage, but it does clear from the TLBs of the CPUs in the configuration, at least those combined region-and-segment-table entries and page table entries in which the table origin field matches the table origin field in general register R3. (In a further embodiment, the implementation may clear a page table entry, regardless of the table origin in the entry. That is, it may clear all page table entries.)

Figure 9:
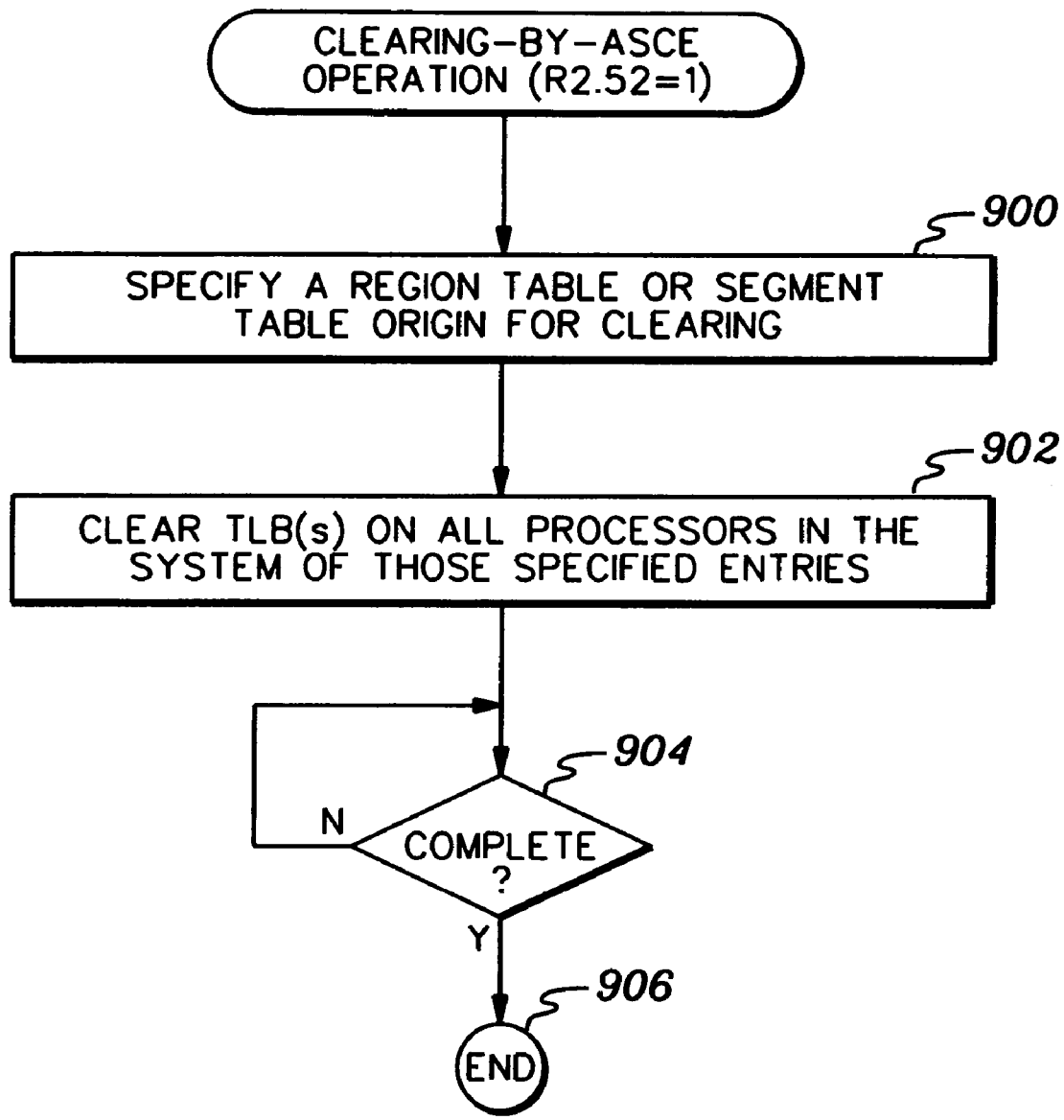
FIG. 9 depicts one embodiment of the logic associated with the alternative operation of the IDTE instruction, in accordance with an aspect of the present invention.

One embodiment of the logic associated with a clearing by ASCE operation is described with reference to FIG. 9. Initially, a region table or segment table origin designating a region table or segment table for which corresponding TLB entries are to be cleared is specified, STEP 900. In one example, this is specified in bits 0–51 of general register R3. Thereafter, at least the combined region-and-segment table entries and page table entries corresponding to the table origin specified in R3 are cleared on all processors in the system, STEP 902.

Subsequently, a determination is made as to whether execution of the IDTE instruction is complete, INQUIRY 904. In one embodiment, the IDTE instruction is not complete on the issuing processor until the TLB entries corresponding to the specified parameters have been cleared on the issuing CPU and the other CPUs in the configuration have completed any storage accesses, including the updating of change and reference bits, by using TLB entries corresponding to the specified parameters. If the entries have been cleared and the storage accesses are complete, then execution of the IDTE instruction is complete, STEP 906. Otherwise, the processor waits for a predetermined amount of time and checks the status once again or is signaled as to completion, INQUIRY 904.

Described in detail above is processing associated with an IDTE instruction. In one embodiment, the operations do not necessarily have any effect on TLB real space entries. The following provides additional information, enhancements and/or embodiments associated with processing of one embodiment of an IDTE instruction.

1. The selective clearing of TLB entries may be implemented in different ways, depending on the model or selected embodiment. For instance, in general, more entries may be cleared than the minimum number specified. When the invalidation-and-clearing operation is performed, all combined region-and-segment table entries (CRSTEs) containing a segment index equal to an effective invalidation index that is a segment index may be cleared, or all CRSTEs may be cleared when the effective invalidation index is not a segment index. Further, a CRSTE or page table entry may be cleared regardless of the page table origin in the entry. When the clearing-by-ASCE operation is performed, a page table entry may be cleared regardless of the table origin in the entry. When either operation is performed, in one embodiment, the precise minimum number of entries required may be cleared.

2. An address-space-control element may contain a real-space token origin instead of a region-table or segment-table origin. A table origin in general register R3 is indistinguishable from a token origin in the register.

3. When the invalidation-and-clearing operation is specified, the clearing of TLB entries may make use of the page-table origin in a segment-table entry. Therefore, if the segment-table entry, when in the attached state, contained a page table origin that is different from the current value, copies of entries containing the previous values may remain in the TLB.

4. When the invalidation-and-clearing operation is specified, the address of the DAT-table entry for the IDTE is a 64-bit address, and the address arithmetic is performed by following the normal rules for 64-bit address arithmetic, with wraparound at $2^{64}-1$. Also, offset and length fields are not used. Accordingly, the DAT tables are not to be specified to wrap from maximum storage locations to location 0, and the first designated entry and all additional entries specified by bits 63–63 of general register R3 should lie within the designated table.

5. The IDTE instruction is subject to interception under SIE. In one embodiment, the system is serialized such that the processor executing the IDTE instruction cannot begin the operation until the other processors have stopped using the TLB entries to be specified. Furthermore, the processor executing the IDTE instruction does not continue with further execution until the appropriate entries have been cleared from the TLBs of all processors in the system.

6. A serialization function is performed before the operation begins and again after the operation is completed. The serialization applies to this CPU; other CPUs are not necessarily serialized.

Described in detail above is one example of an instruction that can invalidate entries of a segment or a region table and atomically clear at least the corresponding entries (or other entries) from one or more Translation Lookaside Buffers. Although a particular instruction is described herein, many variations can be made without departing from the spirit of the present invention. For example, different opcodes, different fields, different registers or even no registers, different bits, etc. may be used. For instance, other instruction set architectures may define an equivalent instruction in somewhat different ways (e.g., different opcodes, different fields in the instruction, different registers used, etc.), but one or more aspects of the present invention still apply. Further, as described above, one or more aspects of the present invention apply equally well to a software emulation of a target architecture, such as IBM's z/Architecture. In this case, the TLBs discussed above may be an array or other data structure implemented by the software emulator to hold recent virtual to real address mappings. It may also be that the emulator software does not implement any structure analogous to a TLB. In this case, only the invalidation of entries in storage may apply.

Thus, an instruction is provided herein that is capable of invalidating storage, invalidating storage and atomically clearing buffer entries, or clearing buffer entries. Therefore, it is said that one or more registers of the instruction are configurable as no-operations (no-ops). That is, the information in those registers, if any, associated with a particular operation (e.g., invalidation, clearing, etc.) that is not being provided is ignored or indicates that the operation is not being performed.

Although a particular instruction is described above in which invalidation, invalidation and clearing, or clearing is provided, the instruction can be modified or other instructions can be implemented that just perform one or more aspects of the operations implemented by IDTE. For example, an instruction can just implement the invalidation of storage. As a further example, the instruction can just purge entries from buffers that are associated with particular segment or region tables. As yet a further example, an instruction can be implemented that just purges entries based on address space.

In a commercial implementation of the invalidation and/or clearing facility computer architected instruction format, the instructions are used by programmers, such as operating system programmers writing in assembler language. These instruction formats stored in a storage medium may be executed natively in a z/Architecture IBM Server, or alternatively, in machines executing other architectures. They can be emulated in the existing and in future IBM mainframe servers and on other machines of IBM (e.g., pSeries® Servers and xSeries® Servers). They can be executed in machines where generally execution is in an emulation mode.

In emulation mode, the specific instruction being emulated is decoded, and a subroutine is built to implement the individual instruction, as in a C subroutine or driver, or some other technique is used for providing a driver for the specific hardware, as is within the skill of those in the art after understanding the description of an embodiment of the invention. Various software and hardware emulation patents including, but not limited to, U.S. Pat. No. 5,551,013, entitled "Multiprocessor for Hardware Emulation," Beausoleil et al.; U.S. Pat. No. 6,009,261, entitled "Preprocessing of Stored Target Routines for Emulating Incompatible Instructions on a Target Processor," Scalzi et al.; U.S. Pat. No. 5,574,873, entitled "Decoding Guest Instruction to Directly Access Emulation Routines That Emulate the Guest Instructions," Davidian et al.; U.S. Pat. No. 6,308,255, entitled "Symmetrical Multiprocessing Bus and Chipset Used for Coprocessor Support Allowing Non-Native Code to Run in a System," Gorishek et al.; U.S. Pat. No. 6,463,582, entitled "Dynamic Optimizing Object Code Translator For Architecture Emulation and Dynamic Optimizing Object Code Translation Method," Lethin et al.; and U.S. Pat. No. 5,790,825, entitled "Method for Emulating Guest Instructions on a Host Computer Through Dynamic Recompilation of Host Instructions," Eric Traut; each of which is hereby incorporated herein by reference in its entirety, and many others, illustrate a variety of known ways to achieve emulation of an instruction format architected for a different machine for a target machine available to those skilled in the art, as well as those commercial software techniques used by those referenced above.

Advantageously, one or more aspects of the present invention increase system performance. For instance, by selectively purging entries from buffers instead of completely purging the buffers, system performance is enhanced by not requiring unnecessary recreation of entries. That is, it requires 20+ to 100s of cycles to create a TLB entry, and selective purging avoids the unnecessary recreation of entries.

As a further advantage, if a full TLB purge is desired, then the implementation allows for over purging. Further, the TLB portion can be treated as a no-op, if, for instance, a TLB is not used. Advantageously, the IDTE instruction can be implemented in hardware, firmware, software or a combination thereof, or it may be used in an emulator of a target computer instruction set.

Many variations to the above environment are possible without departing from the spirit of the present invention. For example, one or more aspects of the present invention are equally applicable to, for instance, virtual machine emulation, in which one or more pageable entities (e.g., guests) execute on one or more processors. As one example, pageable guests are defined by the Start Interpretive Execution (SIE) architecture, one example of which is described in an IBM® publication entitled, "IBM System/370 Extended Architecture," IBM Publication No. SA22-7095 (1985), which is hereby incorporated herein by reference in its entirety.

Although SIE and the z/Architecture are mentioned above, one or more aspects of the present invention are equally applicable to other architectures and/or environments employing pageable entities or similar constructs.

Moreover, the various embodiments described above are just examples. There may be many variations to these embodiments without departing from the spirit of the present invention. For instance, although a logically partitioned environment is described herein, this is only one example. Aspects of the invention are beneficial to many types of environments, including other environments that have a plurality of zones, and non-partitioned environments. Further, there may be no central processor complexes, but yet, multiple processors coupled together. Yet further, one or more aspects of the invention are applicable to single processor environments.

Although particular environments are described herein, again, many variations to these environments can be implemented without departing from the spirit of the present invention. For example, if the environment is logically partitioned, then more or fewer logical partitions may be included in the environment. Further, there may be multiple central processing complexes coupled together. These are only some of the variations that can be made without departing from the spirit of the present invention. Additionally, other variations are possible. For example, although the controller described herein serializes the instruction so that one IDTE instruction executes at one time, in another embodiment, multiple instructions may execute at one time. Further, the environment may include multiple controllers. Yet further, multiple quiesce requests (from one or more controllers) may be concurrently outstanding in the system. Additional variations are also possible.

Advantageously, one or more aspects of the present invention can benefit from performance enhancements described in one or more of the following co-filed applications: U.S. patent application Ser. No. 10/436,361, entitled "Filtering Processor Requests Based On Identifiers," Slegel et al., filed concurrently herewith; U.S. patent application Ser. No. 10/436,209, entitled "Blocking Processing Restrictions Based On Page Indices," Slegel et al., filed concurrently herewith; and U.S. patent application Ser. No. 10/435,961, entitled "Blocking Processing Restrictions Based On Addresses," Slegel et al., filed concurrently herewith, each of which is hereby incorporated herein by reference in its entirety.

As used herein, the term "processing unit" includes pageable entities, such as guests; processors; emulators; and/or other similar components. Moreover, the term "by a processing unit" includes on behalf of a processing unit. The term "buffer" includes an area of storage, as well as different types of data structures, including, but not limited to, arrays; and the term "table" can include other than table type data structures. Further, the instruction can include other than registers to designate information. Moreover, a page, a segment and/or a region can be of sizes different than those described herein.

One or more of the capabilities of the present invention can be implemented in software, firmware, hardware, or some combination thereof. Further, one or more of the capabilities can be emulated.

One or more aspects of the present invention can be included in an article of manufacture (e.g., one or more computer program products) having, for instance, computer usable media. The media has embodied therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. In a computer system having address translation tables for dynamically translating virtual addresses to main storage addresses, a method for invalidating a range of two or more address translation table entries, the method comprising the steps of:
  determining from an opcode of a machine executable instruction to be executed, that the instruction is configured to initiate execution of an invalidate and clear operation; and
  executing the instruction the executing step comprising:
  determining from information provided by the instruction, a first translation table entry address of a first translation table entry, of the range of two or more address translation table entries to be invalidated;
  determining, from range information provided by the instruction, a number of address translation table entries to be invalidated; and
  based on the determined first translation table entry address, invalidating the range of two or more address translation table entries indicated by the range information.

2. The method according to claim 1, wherein the range of two or more address translation table entries to be invalidated each comprise an invalid bit for invalidating, wherein when the invalid bit is 0, use of the address translation table entry for dynamic translation is permitted, wherein when the invalid bit is 1, use of the address translation table entry for dynamic translation is not permitted.

3. The method according to claim 1, wherein the range of two or more translation table entries conisist of any one of segmnent table entries or region table entries.

4. The method according to claim 1, wherein the computer system comprises central processors (CPUs), architected general purpose registers, address translation buffers, the address translation buffers having address translation buffer entries holding address translation information, the address translation tables consisting of any one of:
  one or more segment tables containing entries pointing to page tables,
  one or more first region tables containing entries pointing to second region tables, the second region tables containing entries pointing to third region tables, the third region tables containing entries pointing to segment tables, the segment tables containing entries pointing to page tables,
  one or more second region tables containing entries pointing to third region tables, the third region tables containing entries pointing to segment tables, the segment tables containing entries pointing to page tables,
  one or more third region tables containing entries pointing to segment tables, the segment tables containing entries pointing to page tables; and
  the determining from the opcode step comprising the further step of:
  retrieving second information from a location specified by the instruction, the second information comprising an indication of the invalidate and clear operation.

5. The method according to claim 4, wherein the second information indicates the invalidation and clear function when bit 52 of the second information is 0.

6. The method according to claim 1, wherein the computer system further comprises one or more address translation buffers for catching address translation information the method comprising the further step of:
  d) clearing the address translation buffers of address translation buffer entries associated with address translation table entries of the range of two or more address translation table entries.

7. The method according to claim 6, wherein the address translation buffers consist of one or more translation lookaside buffers (TLBs).

8. The method according to claim 6, wherein the address translation buffers comprise any one of:
  an address translation buffer associated with the central processing unit,
  an address translation buffer associated with another central processing unit of the computer system, or
  all address translation buffers associated with the computer system.

9. The method according to claim 1, wherein the step of determining from an opcode comprises the further steps of:
  fetching the instruction from the main storage, the instruction comprising:

a) a first field for locating third information, the third information comprising an address translation table origin location for invalidation, and b) a second field for locating fourth information, the fourth information comprising an address translation table index portion; and forming the first translation table entry address from the third information in conjunction with the fourth information.

10. The method according to claim 9, wherein the first field locates the third information in a first architected general purpose register, wherein the address translation table origin location for invalidation consists of any one of an address of a region table or an address of a segment table.

11. The method according to claim 9, wherein the third information further comprises a designation type control field for designating any one of a region for invalidation or a segment table for invalidation.

12. The method according to claim 9, wherein the second field locates, the fourth information, the fourth information comprising a first region index field, a second region index field, a third region index field, a segment index field and the range.

13. The method according to claim 12, wherein the number of address translation table entries to be invalidated determining step comprises the further step of:

decrementing the range information;
the method further comprising any one of the steps of:
a) based on the value of the first region index field indexing into a first region table to find an entry to invalidate, the entry to invalidate comprising a second region table origin;
b) based on the value of the second region index field indexing into a second region table to find an entry to invalidate, the entry to invalidate comprising a third region table origin;
c) based on the value of the third region index field indexing into a third region table to find an entry to invalidate, the entry to invalidate compising a segment table origin; or
based on the value of the segment index field indexing into a segment table to find an entry to invalidate, the entry to invalidate comprising a page table origin.

14. The method according to claim 9, wherein the third information further comprises any one of a region table origin for invalidation or a segment table origin for invalidation, wherein further the second field locates a second architected general purpose register comprising the fourth information, wherein the fourth information further comprises any one of a region index field or a segment index field, wherein the invalidating a predetermined range of one or more address translation table entries step comprises the further step of:

when invalidating any one of first region entries, second region entries or third region entries performing the steps of:
aa) adding any one of a first region index, a second region index or a third region index to the region table origin for invalidation to form the address of a target region entry;
ba) invalidating the target region entry, the target region entry located at the address of the target region entry;
ca) incrementing the address of the target region entry;
da) decrementing a value of the range of entries to be invalidated; and ea) then when the decremented value of the range of entries to be invalidated is greater than zero, repeating steps aa) through da);

when invalidating segment entries, performing the steps of:
fa) adding the segment index field to segment table origin for invalidation to form the address of a target segment entry;
ga) invalidating the target segment entry, the target segment entry located at the address of the target segment entry;
ha) incrementing the address of the target segment entry;
ia) decrementing a value of the range of entries to be invalidated; and
ja) then when the decremented value of the range of entries to be invalidated is greater than zero, repeating steps fa) through ia); and
when the decremented value of the range of entries to be invalidated is zero, ending execution of the instruction.

15. The method according to claim 14 comprising the further step of saving the decremented value of the range of entries to be invalidated in the second information location identified by the second field.

16. The method according to claim 1 wherein the instruction consists of 32 contiguous bits, including an opcode field consisting of 16 contiguous bits, a first operand field consisting of 4 contiguous bits, a second operand field consisting of 4 contiguous bits, and a third operand field consisting of 4 contiguous bits, wherein the contiguous bits of the first field are contiguous with the contiguous bits of the second field and wherein the operarwl fields specify respective general purpose registers of a computer architected register space.

17. The method according to claim 1, comprising the further steps of:
interpreting the instruction to identify a predetermined software routine for emulating the operation of the instruction on an underlying central processing unit having a different instruction set architecture, the predetermined software routine comprising a plurality of insructions; and
wherein the executing step further comprises executing the predetermined software routine.

18. The method according to claim 1 wherein the invalidating the range of two or more address translation table entries step comprises the further step of marking invalid, an invalid bit of each of the address translation table entries of the range of two or more address translation table entries.

19. The method according to claim 1, wherein the computer system further comprises page tables, the page tables having real main storage addresses, wherein real main storage addresses comprise any one of an absolute address, a real address or a physical address.

20. A computer program product for invalidating a range of two or more address translation table entries, in a computer system having address translation tables for dynamically translating virtual addresses to main storage addresses, the computer program product comprising:
a storage medium readable by a processing circuit and storing instructions for execution by the processing circuit for performing a method comprising:
determining from an opcode of a machine executable instruction to be executed, that the instruction is configured to initiate execution of an invalidate and clear operation; and executing the instruction, the executing step comprising:
    determining, from information provided by the instruction, a first translation table entry address of a first translation table entry, of the range of two or more address translation table entries to be invalidated;
    determining, from range information provided by the instruction, a number of address translation table entries to be invalidated; and
    based on the determined first translation table entry address invalidating the range of two or more address translation table entries indicated by the range information.

21. The computer program product according to claim 20, wherein the range of two or more address translation table entries to be invalidated each comprise an invalid bit for invalidating, wherein when the invalid bit is 0, use of the address translation table entry for dynamic translation is permitted, wherein when the invalid bit is 1, use of the address translation table entry for dynamic translation is not permitted.

22. The computer program product according to claim 20, wherein the range of two or more translation table entries consist of any one of segment table entries or region table entries.

23. The computer program product according to claim 20, wherein the computer system comprises processors (CPUs), architected general purpose registers, address translation buffers, the address translation buffers having address translation buffer entries holding address translation information, the address translation tables consisting of any one of;
    one or more segment tables containing entries pointing to page tables,
    one or more first region tables containing entries pointing to second region tables, the second region tables containing entries pointing to third region tables, the third region tables containing entries pointing to segment tables, the segment tables containing entries pointing to page tables,
    one or more second region tables containing entries pointing to third region tables, the third region tables containing entries pointing to segment tables, the segment tables containing entries pointing to page tables,
    one or more third region tables containing entries pointing to segment tables, the segment tables containing entries pointing to page tables; and
    the determining from the opcode step comprising the further step of:
    retrieving second information from a location specified by the instruction, the second information comprising an indication of the invalidate and clear operation.

24. The computer program product according to claim 23, wherein the second information indicates the invalidation and clear function when bit 52 of the second information is 0.

25. The computer program product according to claim 20, wherein the computer system further comprises one or more address translation buffers for caching address translation information, the computer program product comprising the further step of:
    d) clearing the address translation buffer of address translation buffer entries associated with address translation table entries of the range of two or more address translation table entries.

26. The computer program product according to claim 25, wherein the address translation buffers consist of one or more translation lookaside buffers (TLBs).

27. The computer program product according to claim 25, wherein the address translation buffers comprise any one of:
    an address translation buffer associated with the central processing unit,
    an address translation buffer associated with another central processing unit of the computer system, or
    all address translation buffers associated with the computer system.

28. The computer program product according to claim 20, wherein the step of determining from an opcode comprises the further steps of:
    fetching the instruction from the main storage, the instruction comprising:
        a) a first field for locating third information, the third information comprising an address translation table origin location for invalidation, and
        b) a second field for locating fourth information, the fourth information comprising an address translation table index portion; and
    forming the first translation table entry address from the third information in conjunction with the fourth information.

29. The computer program product according to claim 28, wherein the first field locates the third information in a first architected general purpose register, wherein the address translation table origin location for invalidation consists of any one of an address of a region table or on address of a segment table.

30. The computer program product according to claim 28, wherein the third information further comprises a designation type control field for designating any one of a region for invalidation or a segment table for invalidation.

31. The computer program product according to claim 28, wherein the second field locates the fourth information, the fourth information comprising a first region index field, a second region index field, a third region index field, a segment index field and the range.

32. The computer program product according to claim 31, wherein the number of address translation table entries to be invalidated determining step comprises the further step of:
    decrementing the range information;
    the computer program product further comprising any one of the steps of:
        a) based on the value of the first region index field indexing into a first region table to find an entry to invalidate, the entry to invalidate comprising a second region table origin;
        b) based on the value of the second region index field indexing into a second region table to find an entry to invalidate, the entry to invalidate comprising a third region title origin;
        c) based on the value of the third region index field indexing into a third region table to find an entry to invalidate, the entry to invalidate comprising a segment table origin; or
        d) based on the value of the segment index field indexing into a segment table to find an entry to invalidate, the entry to invalidate comprising a page table origin.

33. The computer program product according to claim 28, wherein the third information further comprises any one of a region table origin for invalidation or a segment table origin for invalidation, wherein further the second field locates a second architected general purpose register comprising the fourth information, wherein the fourth information further comprises any one of a region index field or a segment index field, wherein the invalidating a predetermined range of one or more address translation table entries step comprises the further step of:

when invalidating any one of first region entries, second region entries or third region entries performing the steps of:
- aa) adding any one of a first region index, a second region index or a third region index to the region table origin for invalidation to form the address of a target region entry;
- ba) invalidating the target region entry, the target region entry located at the address of the target region entry;
- ca) incrementing the address of the target region entry;
- da) decrementing a value of the range of entries to be invalidated; and
- ea) then when the decremented value of the range of entries to be invalidated is greater than zero, repeating steps aa) through da);

when invalidating segment entries, performing the steps of:
- fa) adding the segment index field to segment table origin for invalidation to form the address of a target segment entry;
- ga) invalidating the target segment entry, the target segment entry located at the address of the target segment entry;
- ha) incrementing the address of the target segment entry;
- ia) decrementing a value of the range of entries to be invalidated; and
- ja) then when the decremented value of the range of entries to be invalidated is greater than zero, repeating steps fa) through ia); and when the decremented value of the range of entries to be invalidated is zero, ending execution of the instruction.

34. The computer program product according to claim 33 comprising the further step of saving the decremented value of the range of entries to be invalidated in the second information location identified by the second field.

35. The computer program product according to claim 20 wherein the instruction consists of 32 contiguous bits, including an opcode field consisting of 16 contiguous bits, a first operand field consisting of 4 contiguous bits, a second operand field consisting of 4 contiguous bits, and a third operand field consisting of 4 contiguous bits, wherein the contiguous bits of the first field are contiguous with the contiguous bits of the second field and wherein the operand fields specify respective general purpose registers of a computer architected register space.

36. The computer program product according to claim 20, comprising the further steps of:

interpreting the instruction to identify a predetermined software routine for emulating the operation of the instruction on an underlying central processing unit having a different instruction set architecture, the predetermined software routine comprising a plurality of instructions; and wherein the executing step further comprises executing the predetermined software routine.

37. The computer program product according to claim 20, wherein the invalidating the range of two or more address translation table entries step comprises the further step of marking invalid, an invalid bit of each of the address translation table entries of the range of two or more address translation table entries.

38. The computer program product according to claim 20, wherein the computer system further comprises page tables, the page tables having real main storage addresses, wherein real main storage addresses comprise any one of an absolute address, a real address or a physical address.

39. A computer system for invalidating a range of two or more address translation table entries, the system comprising:
- a main storage;
- one or more central processors in communications with the main storage;
- architected general purpose registers accessible to the one or more central processors;
- address translation tables for dynamically translating virtual addresses to main storage addresses, the address translation tables accessible to the one or more central processors;
- one or more instruction execution units accessible to the one or more central processors, the instruction execution units in communication with the architected general purpose registers, the instruction execution units executing machine instructions fetched from the main storage;
- wherein the computer system includes instructions to execute a method comprising:
  - determining from an opcode of a machine executable instruction to be executed, that the instruction is configured to initiate execution of an invalidate and clear operation; and
  - executing the instruction, the executing step comprising:
    - determining, from information provided by the instruction, a first translation table entry address of a first translation table entry, of the range of two or more address translation table entries to be invalidated;
    - determining, from range information provided by the instruction, a number of address translation table entries to be invalidated; and
    - based on the determined first translation table entry address, invalidating the range of two or more address translation table entries indicated by the range information.

40. The system according to claim 39, wherein the range of two or more address translation table entries to be invalidated each comprise an invalid bit for invalidating, wherein when the invalid bit is 0, use of the address translation table entry for dynamic translation is permitted, wherein when the invalid bit is 1, use of the address translation table entry for dynamic translation is not permitted.

41. The system according to claim 39, wherein the range of two or more translation table entries consist of any one of segment table entries or region table entries.

42. The system according to claim 39, wherein the computer system comprises central processors (CPUs), architected general purpose registers, address translation buffers, the address translation buffers having address translation buffer entries holding address translation information, the address translation tables consisting of any one of:
- one or more segment tables containing entries pointing to page tables,
- one or more first region tables containing entries pointing to second region tables, the second region tables containing entries pointing to third region tables, the third region tables containing entries pointing to segment tables, the segment tables containing entries pointing to page tables, one or more second region tables containing entries pointing to third region tables, the third region tables containing entries pointing to segment tables, the segment tables containing entries pointing to page tables, one or more third region tables containing entries pointing to segment tables, the segment tables containing entries pointing to page tables; and the determining from the opcode step comprising the further step of:

retrieving second information from a location specified by the instruction, the second information comprising an indication of the invalidate and clear operation.

43. The system according to claim 42, wherein the second information indicates the invalidation and clear function when bit 52 of the second information is 0.

44. The system according to claim 39, wherein the computer system further comprises one or more address translation buffers for caching address translation information, the system comprising the further step of:

d) clearing the address translation buffers of address translation buffer entries associated with address translation table entries of the range of two or more address translation table entries.

45. The system according to claim 44, wherein the address translation buffers consist of one or more translation lookaside buffers (TLBs).

46. The system according to claim 44, wherein the address translation buffers comprise any one of:

an address translation buffer associated with the central processing unit, an address translation buffer associated with another central processing unit of the computer system, or all address translation buffers associated with the computer system.

47. The system according to claim 39, wherein the step of determining from an opcode comprises the further steps of:

fetching the instruction from the main storage, the instruction comprising:

a) a first field for locating third information, the third information comprising an address translation table origin location for invalidation, and b) a second field for locating fourth information, the fourth information comprising an address translation table index portion; and forming the first translation table entry address from the third information in conjunction with the fourth information.

48. The system according to claim 47, wherein the first field locates the third information in a first architected general purpose register, wherein the address translation table origin location for invalidation consists of any one of an address of a region table or an address of a segment table.

49. The system according to claim 47, wherein the third information further comprises a designation type control field for designating any one of a region for invalidation or a segment table for invalidation.

50. The system according to claim 47, wherein the second field locates the fourth information, the fourth information comprising a first region index field, a second region index field, a third region index field, a segment index field and the range.

51. The system according to claim 50, wherein the number of address translation table entries to be invalidated determining step comprises the further step of:

decrementing the range information;

the system further comprising any one of the steps of:

a) based on the value of the first region index field indexing into a first region table to find an entry to invalidate, the entry to invalidate comprising a second region table origin;

b) based on the value of the second region index field indexing into a second region table to find an entry to invalidate, the entry to invalidate, comprising a third region table origin;

c) based on the value of the third region index field indexing into a third region table to find an entry to invalidate, the entry to invalidate comprising a segment table origin; or d) based on the value of the segment index field indexing into a segment table to find an entry to invalidate, the entry to invalidate comprising a page table origin.

52. The system according to claim 47, wherein the third information further comprises any one of a region table origin for invalidation or a segment table origin for invalidation, wherein further the second field locates a second architected general purpose register comprising the fourth information, wherein the fourth information further comprises any one of a region index field or a segment index field, wherein the invalidating a predetermined range of one or more address translation table entries step comprises the further step of:

when invalidating any one of first region entries, second region entries or third region entries performing the steps of:

aa) adding any one of a first region index, a second region index or a third region index to the region table origin for invalidation to form the address of a target region entry;

ba) invalidating the target region entry, the target region entry located at the address of the target region entry;

ca) incrementing the address of the target region entry;

da) decrementing a valve of the range of entries to be invalidated; and ea) then when the decremented value of the range of entries to be invalidated is greater than zero, repeating steps aa) through da);

when invalidating segment entries, performing the steps of:

fa) adding the segment index field to segment table origin for invalidation to form the address of a target segment entry;

ga) invalidating the target segment entry, the target segment entry located at the address of the target segment entry;

ha) incrementing the address of the target segment entry;

ia) decrementing a value of the range of entries to be invalidated; and ja) then when the decremented value of the range of entries to be invalidated is greater than zero, repeating steps fa) through ia); and when the decremented value of the range of entries to be invalidated is zero, ending execution of the instruction.

53. The system according to claim 52 comprising the further step of saving the decremented value of the range of entries to be invalidated in the second information location identified by the second field.

54. The system according to claim 39 wherein the instruction consists of 32 contiguous bits, including an opcode field consisting of 16 contiguous bits, a first operand field consisting of 4 contiguous bits, a second operand field consisting of 4 contiguous bits, and a third operand field consisting of 4 contiguous bits, wherein the contiguous bits of the first field are contiguous with the contiguous bits of the second field and wherein the operand fields specify respective general purpose registers of a computer architected register space.

55. The system according to claim 39, comprising the further steps of:
   interpreting the instruction to identify a predetermined software routine for emulating the operation of the instruction on an underlying central processing unit having a different instruction set architecture, the predetermined software routine comprising a plurality of instructions; and wherein the executing step further comprises executing the predetermined software routine.

56. The system according to claim 39, wherein the invalidating the range of two or more address translation table entries step comprises the further step of making invalid, an invalid bit of each of the address translation table entries of the range of two or more address translation table entries.

57. The system according to claim 39, wherein the computer system further comprises page tables, the page tables having real main storage addresses, wherein real main storage addresses comprise any one of an absolute address, a real address or a physical address.

* * * * *